US009584803B2

(12) United States Patent
Rodriguez et al.

(10) Patent No.: US 9,584,803 B2
(45) Date of Patent: Feb. 28, 2017

(54) PICTURE OUTPUT MANAGEMENT IN VIDEO APPLICATIONS WITH FIXED PICTURE RATE

(71) Applicant: Cisco Technology, Inc., San Jose, CA (US)

(72) Inventors: Arturo A. Rodriguez, Norcross, GA (US); Anil Kumar Katti, Atlanta, GA (US); Hsiang-Yeh Hwang, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 475 days.

(21) Appl. No.: 13/937,209

(22) Filed: Jul. 8, 2013

(65) Prior Publication Data

US 2014/0010281 A1 Jan. 9, 2014

Related U.S. Application Data

(60) Provisional application No. 61/669,110, filed on Jul. 8, 2012.

(51) Int. Cl.
*H04N 21/435* (2011.01)
*H04N 19/134* (2014.01)
(Continued)

(52) U.S. Cl.
CPC ..... *H04N 19/00133* (2013.01); *H04N 19/132* (2014.11); *H04N 19/156* (2014.11);
(Continued)

(58) Field of Classification Search
CPC ..... H04N 19/00133; H04N 21/440281; H04N 19/31; H04N 19/156; H04N 21/435; H04N 21/44004; H04N 19/132; H04N 19/44
(Continued)

(56) References Cited

U.S. PATENT DOCUMENTS

2006/0110055 A1* 5/2006 Shiina ............ G11B 27/034
382/232
2006/0120462 A1* 6/2006 Tsuboi ............ H04N 21/4305
375/240.25

(Continued)

*Primary Examiner* — Jamie Atala
*Assistant Examiner* — Hesham Abouzahra
(74) *Attorney, Agent, or Firm* — Merchant & Gould P.C.

(57) ABSTRACT

In one embodiment, a video bitstream is received at a video processing device. The bitstream may be decoded by the video processing device to produce a first picture data and a second picture data. The decoded first picture data and decoded second picture data may be stored in a decoded picture buffer. The first decoded picture data has a corresponding first picture rate and the second decoded picture data has a corresponding second picture rate. Auxiliary information corresponding to the bitstream may be received for the first picture data and second picture data at the video processing device. The decoded first picture data stored in the decoded picture buffer may be processed by the video processing device based on the received auxiliary information. The decoded first picture data may be processed based on the auxiliary information to produce a version of the first picture data at the second picture rate, the second picture rate being different from the first picture rate.

19 Claims, 6 Drawing Sheets

(51) Int. Cl.
*H04N 21/44* (2011.01)
*H04N 19/172* (2014.01)
*H04N 19/132* (2014.01)
*H04N 19/156* (2014.01)
*H04N 19/44* (2014.01)
*H04N 19/31* (2014.01)
*H04N 21/4402* (2011.01)

(52) U.S. Cl.
CPC ........... *H04N 19/172* (2014.11); *H04N 19/31* (2014.11); *H04N 19/44* (2014.11); *H04N 21/435* (2013.01); *H04N 21/44004* (2013.01); *H04N 21/440281* (2013.01)

(58) Field of Classification Search
USPC .................................................. 375/240.02
See application file for complete search history.

(56) References Cited

U.S. PATENT DOCUMENTS

| | | | | |
|---|---|---|---|---|
| 2006/0245504 | A1* | 11/2006 | Ogikubo | G11B 27/105 375/240.25 |
| 2008/0205527 | A1* | 8/2008 | Watanabe | H04N 19/51 375/240.16 |
| 2010/0046635 | A1* | 2/2010 | Pandit | H04N 19/597 375/240.25 |
| 2011/0085779 | A1* | 4/2011 | Hattori | G11B 27/105 386/240 |

* cited by examiner

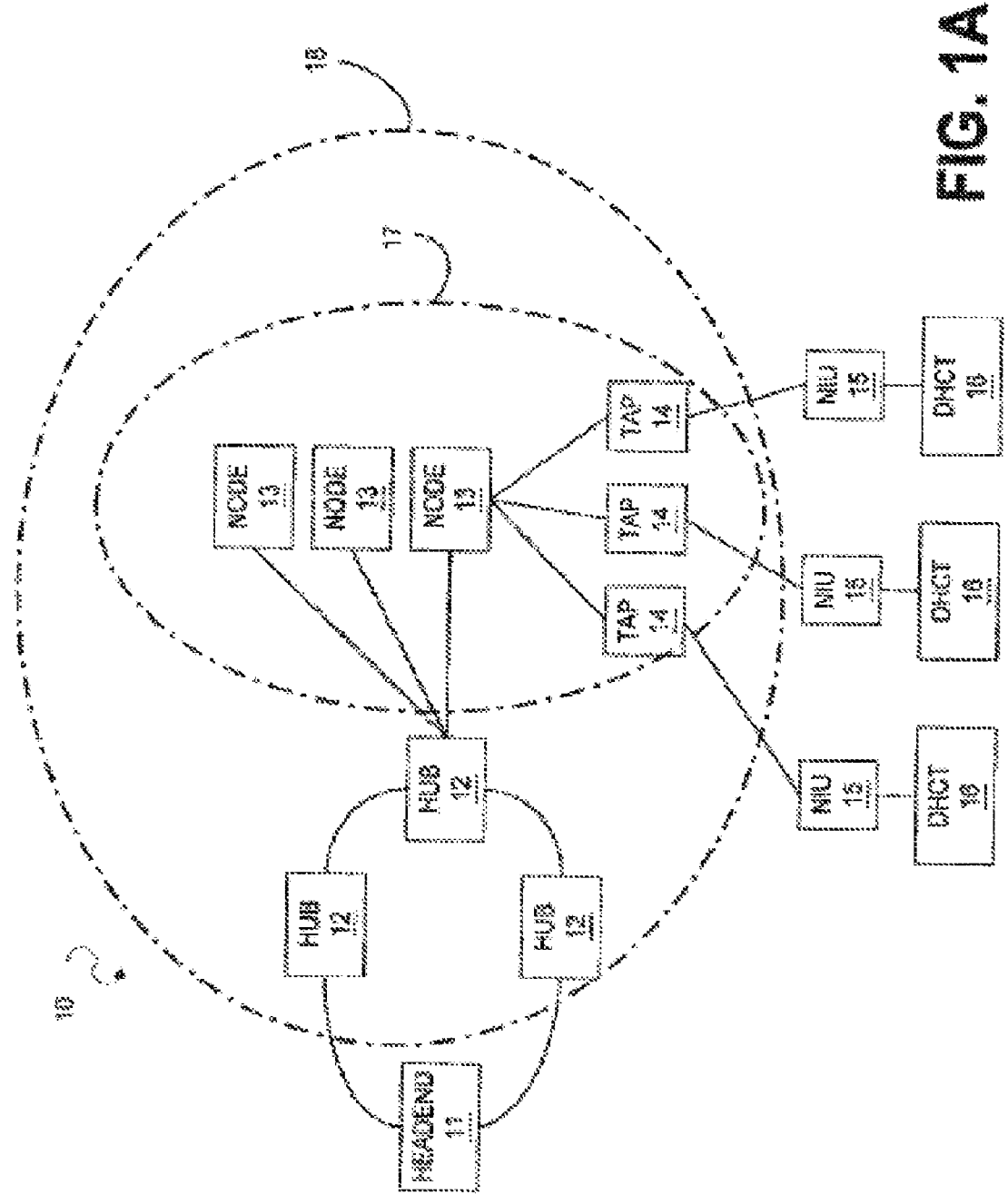

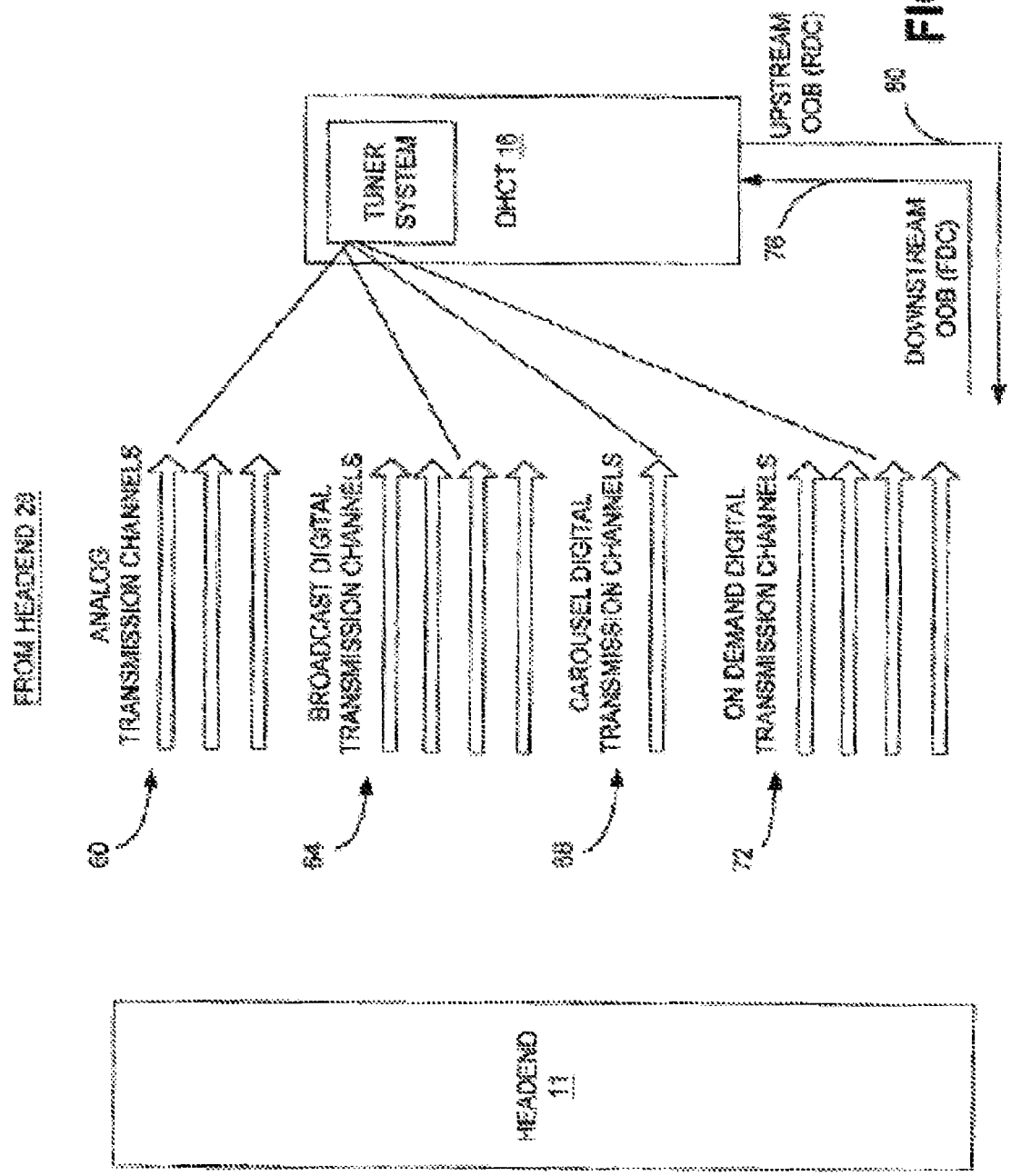

US 9,584,803 B2

PICTURE OUTPUT MANAGEMENT IN VIDEO APPLICATIONS WITH FIXED PICTURE RATE

TECHNICAL FIELD

This disclosure relates in general to video processing.

BACKGROUND

In network systems such as subscriber television systems, a digital home communication terminal ("DHCT"), otherwise known as the set-top box, is capable of providing video services connected to the subscriber television system, and is typically located at the user's premises and connected to the subscriber television system, such as, for example, a cable or satellite network. The DHCT includes hardware and software necessary to provide digital video services to the end user with various levels of usability and/or functionality. One of the features of the DHCT includes the ability to receive and decompress a digital video signal in a compressed format, wherein such compression may be in accordance with a video coding specification such as the Advanced Video Coding (AVC) standard, and the resulting coded video streams are referred to herein as bitstreams. New video coding specifications generally have a rich set of compression tools and can exploit temporal redundancies among pictures in more elaborate and comprehensive ways than prior video coding standards. Such advanced features also impose management of when decoded pictures are output and their corresponding resources are marked to be released for consumption by subsequent decoded pictures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A is a diagram illustrating shows a block diagram view of a subscriber television system (STS).

FIG. 1B is a block diagram illustrating the transmission signals supported by the STS.

DETAILED DESCRIPTION

Overview

Figure 2:
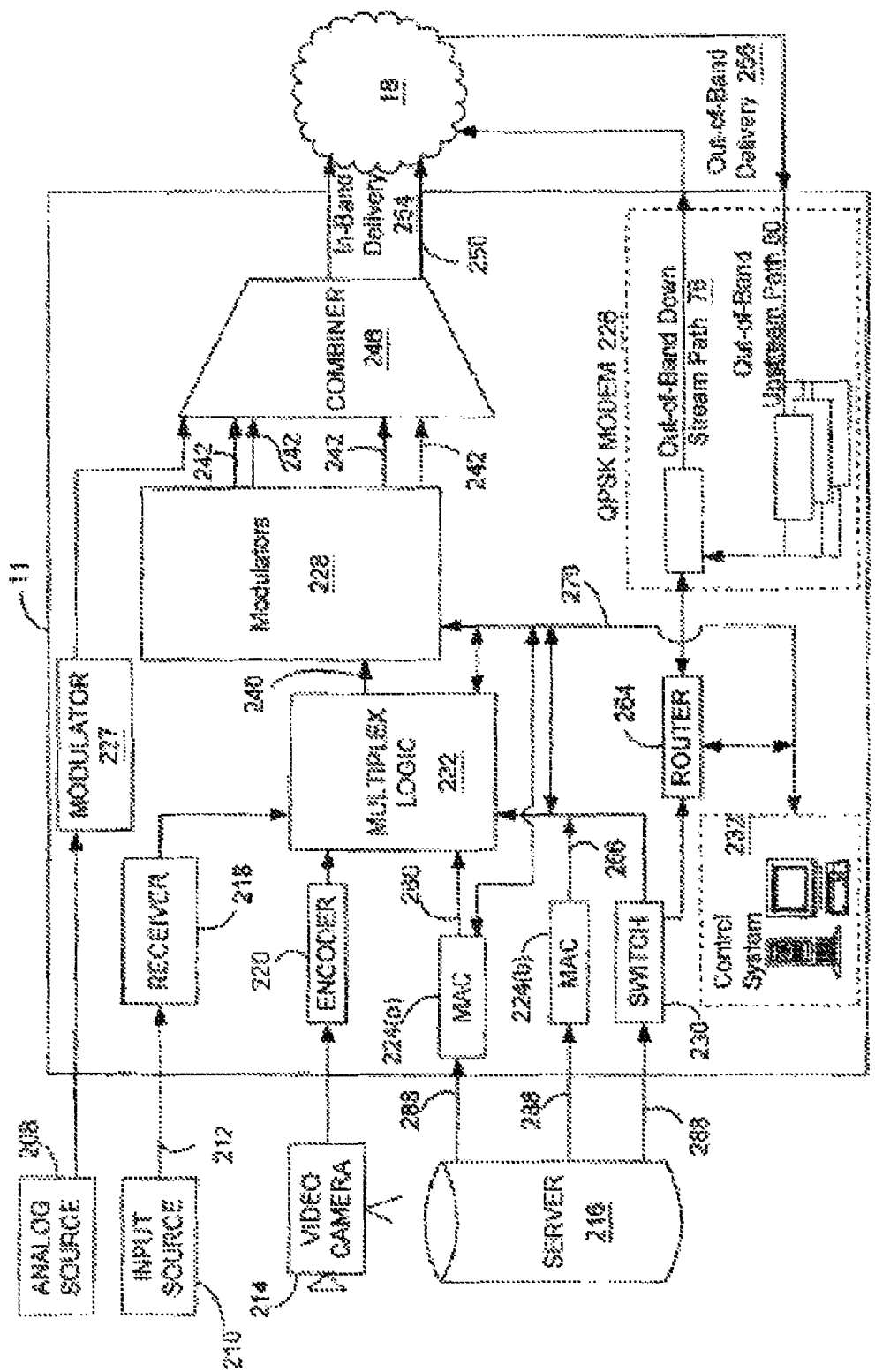
FIG. 2 is an overview of a headend, which provides the interface between the STS and the service and content providers.

In one embodiment, a bitstream is received at a video processing device. The bitstream may be decoded by the video processing device to produce a first picture data and a second picture data. The decoded first picture data and decoded second picture data may be stored in a decoded picture buffer. The decoded first picture data may have a first picture rate and the decoded second picture data may have a second picture rate. Auxiliary information associated with the bitstream may be received at the video processing device. The decoded first picture data stored in the decoded picture buffer may be processed by the video processing device based on the received auxiliary information, to produce a version of the decoded first picture data at the second picture rate, the second picture rate being different from the first picture rate.

Example Embodiments

Disclosed herein are various example embodiments of video processing (VP) systems and methods (collectively, referred to herein also as a VP system or VP systems) that convey and process auxiliary information delivered in, corresponding to, or associated with, a bitstream.

The Advanced Video Coding (H.264/AVC) standard is known as ITU-T Recommendation H.264 and ISO/IEC international Standard 14496-10, also known as MPEG-4 Part 10 Advanced Video Coding (AVC). Similarly to earlier video coding standards, a video coding specification provides the syntax and semantics for the bitstream that enable the decoding process for error-free bitstreams.

The input to a video encoder is a sequence of pictures and the output of a video decoder is also a sequence of pictures. A picture may either be a frame or a field. A frame comprises a matrix of luma samples and corresponding chroma samples. A field is a set of alternate sample rows of a frame and may be used as encoder input, when the source signal corresponds to interlaced video. A picture is partitioned into contiguous non-overlapping blocks of luma samples and their corresponding blocks of chrome samples for encoding purposes. Each of the contiguous non-overlapping blocks in their coded form is called a Coding Tree Unit (CTU). A picture is further partitioned to one or more slices, each including an integer number of coded blocks (i.e., CTUs) ordered consecutively in raster scan order. In one embodiment, each coded picture is coded as a single slice.

A video encoder outputs a bitstream of coded pictures corresponding to the input sequence of pictures. The bitstream of coded pictures is the input to a video decoder, which outputs a sequence of pictures corresponding to the decoded version of the coded pictures of the input bitstream.

In a video coding specification, such as AVC/H.264, each network abstraction layer (NAL) unit in the bitstream has a NAL unit header that includes a NAL unit type. Each coded picture in the bitstream corresponds to an access unit comprising one or more NAL units.

A NAL unit can identify with its NAL unit type a respectively corresponding type of data, such as a sequence parameter set (SPS), a picture parameter set (PPS), an SEI (Supplemental Enhancement Information), or a slice which consists of a slice_header followed by slice data (i.e. coded picture data). The SPS may contain video usability information (VUI). A coded picture includes the NAL units that are required for the decoding of the picture.

The bitstream produced by a video encoder consists of one or more coded video sequences (CVSes). Each coded video sequence (CVS) corresponds to a random access point (RAP) that enables entering the bitstream at that point. The CVS consists, in decoding order, of a first picture called a RAP picture, which corresponds to an intra coded picture, followed by other pictures up to but not including the first picture of the next CVS. Each CVS corresponds respectively to a set of parameters, such as an SPS and one or more PPSes, required to decode the coded pictures in the CVS.

Certain parameters of the bitstream are only allowed to change at the start of a CVS. The fixed_pic_rate_flag and decoding picture rate are only allowed to change at the start of a CVS.

In one embodiment the picture decode rate is controlled via a specified clock tick specified by the parameters corresponding to the respective CVS. In an alternate embodiment, the picture output rate is controlled via the clock tick specified by the parameters corresponding to the respective CVS The bitstream syntax of the video coding specification indicates whether or not a particular coded picture is a reference picture for inter prediction of any other picture. Consequently, a picture not used for prediction (a non-reference picture) is not marked as "used for reference" by the video decoder and when it is no longer needed for output, the video decoder can further mark it as "no longer needed for output" so that the corresponding frame buffer of the Decoded Picture Buffer (DPB) it occupies can be re-used by a subsequent decoded picture.

In accordance with the video coding specification, a video decoder marks decoded non-reference and reference pictures that reside in the DPB respectively as "not needed for reference" or "needed for reference." The video decoder further marks a decoded reference picture that resides in the DPB as "not needed for reference" after it is no longer needed for reference for the decoding of other coded pictures in the bitstream. Likewise, the video decoder marks a decoded picture as "not needed for output" when the picture has been output, or in accordance with one embodiment, when after the last output instance of the picture.

The markings are performed in order to free up the consumption or occupancy of frame buffers of the DPB.

The hypothetical reference decoder (HRD) of a video coding specification, such as specified in Annex C of H.264/AVC, specifies bitstream and decoder conformance. The HRD is an instantaneous decoding process and contains a coded picture buffer (CPBand theDPB.

A decoded picture may occupy a frame buffer of the DPB because it is used as a reference in inter-prediction by one or more subsequent coded pictures, or because its output time is later than its decode time In accordance with the HRD, the frame buffer of the DPB occupied by a first decoded picture becomes available (i.e., freed up) to store a subsequent decoded picture (i.e., a second decoded picture) upon the first decoded picture being marked as "not needed for reference" and "not needed for output."

As discussed previously the definition of the output of a picture in a video coding specification, such as ITU H.264 (a.k.a. as MPEG-4 AVC or ISO/IEC 14496 Part 10), typically refers to the time that picture is output from the DPB, and not necessarily the time that the picture is presented or displayed in a visual surface or emitting light device, such as display monitor or television. For conformance purposes, the picture's output time is its DPB output time, which herein is referred to as the picture's POC. The picture POC may also be indicated by its derived PicOrderCntVal value. The PicOrderCntVal value may be used to relate the picture to other picture in the DPB (and/or vice versa). The PicOrderCntVal value further be used to relate to the current picture's output time to the current picture being output from the DPB, derived and denoted by CurrPicOrderCntVal.

A parameter such as log 2_max_pic_order_cnt_lsb_minus4 may be provided in a sequence parameter set (SPS) corresponding to a respective CVS in the bitstream. The log 2_max_pic_order_cnt_lsb_minus4 parameter may provide a value of a variable MaxPicOrderCntLsb parameter. The MaxPicOrderCntLsb parameter of a picture may be used in the decoding process for the picture order count for pictures in the CVS. For instance the variable MaxPicOrderCntLsb parameter for a picture may be represented as:

MaxPicOrderCntLsb=2**exp_msbPOC(i.e., in $C$ language notation meaning 2 raised to the exp_msbPOC)

wherein exp_msbPOC=(log 2_max_pic_order_cnt_lsb_minus4+4)

In one embodiment, the pic_order_cnt_lsb may be a parameter in a respective slice header of a first slice of a coded picture in the CVS. As discussed previously, each coded picture may be coded and provided as a single slice. In an alternate embodiment, pic_order_cnt_lsb may be provided in each of the slice headers of a picture in the CVS coded in plural slices.

As discussed previously, a slice may correspond to a raster scan sequence of plural non-overlapping and contiguously coded units (such as blocks, 2D rectangular regions, or 2D squares) corresponding respective to the spatial domain of the picture. When a picture is coded as a single slice, a first coded unit of the picture in the slice may correspond to the coded unit that includes a top left sample (or pixel) of the picture, and a last coded unit of the picture in the slice may correspond to the coded unit that includes the bottom right (or pixel) of the picture.

In one embodiment, pic_order_cnt_lsb value of a picture may specify a picture order count modulo MaxPicOrderCntLsb for the picture. A length of the pic_order_cnt_lsb syntax element is log 2_max_pic_order_cnt_lsb_minus4+4 bits. The value of the pic_order_cnt_lsb may be in a range of 0 to MaxPicOrderCntLsb−1.

In one embodiment, each coded picture may be associated with one picture order count, which may be denoted as PicOrderCntVal for the picture. The PicOrderCntMsb value may be set equal to 0 for the first coded picture in the CVS. Other than the first coded picture in the CVS, a picture's POC value may be derived using the following equation:

PicOrderCntVal=PicOrderCntMsb+pic_order_cnt_lsb wherein pic_order_cnt_lsb is provided in slice header of the picture, and PicOrderCntMsb is derived as a function of a set of variables. The PicOrderCntMsb may be derived based on the following variables:

a. the PicOrderCntMsb value corresponding to a last decoded reference picture (in the bitstream prior to the current picture), referred herein as lastRefpic;

b. a pic_order_cnt_lsb value of the lastRefpic; and c. a MaxPicOrderCntLsb value, as described above.

In an alternate embodiment, pic_order_cnt_lsb is derived in relation to some picture that resets the value of pic_order_cnt_lsb to zero.

In one embodiment, the PicOrderCntVal value for any two coded pictures in a CVS may be different. When a fixed_pic_rate_flag=1 in a CVS, the value of PicOrderCntVal may increase with respect to the value of PicOrderCntVal corresponding to the immediately prior output picture. As an example, a PicOrderCntVal of a picture X may be represented by the following equation:

PicOrderCnt(picX)=PicOrderCntVal of the picture picX

A difference in the PicOrderCntVal of two pictures in the CVS may be calculated using the following equation:

DiffPicOrderCnt(picA,picB)=PicOrderCnt(picA)−PicOrderCnt(picB)

In one embodiment, when in a CVS, fixed_pic_rate_flag=1 each successive clock tick corresponds to an increment PicOrderCntVal. If a picture rate of coded pictures in the CVS (e.g., the number of coded pictures per second) equals the fixed picture rate, a different picture will be output per each successive clock tick. In another embodiment, a different picture will be output per each successive K clock ticks. If the rate of coded pictures in the CVS is less than the fixed picture rate, the output of at least one picture will be repeated. In one embodiment, the output of the picture may be repeated more than twice. When fixed_pic_rate_flag=1 the PicOrderCntVal value is proportional to the sampling time of the corresponding picture relative to the sampling time of the start of the CVS.

In one embodiment, consecutiveCVSes of a bitstream have a fixed picture rate and a constant clock tick. The constant clock tick is specified via num_units_in_tick's and time_scale, provided by the parameters respectively corresponding to each CVS, and may be defined as $t_c$=(num_units_in_tick×time_scale). The constant clock tick avoids changes in the physical video output signal in a video decoder which would otherwise impart a viewing disruption. Signalling is provided by a video encoder and received by a video decoder for bitstream containing CVSes which correspond to video sources with respective picture rates lower than the fixed picture rate intended for output, such as when the video source corresponds to 24 Hz film content and the fixed picture rate is 60 Hz.

Any two consecutive CVSes in a bitstream may correspond to two respective sources with different picture rates, such as when the CVS corresponds to a 60 Hertz source and the preceding CVS corresponds to a 24 Hertz source. Furthermore, to minimize or eliminate the number of blank output pictures across transitions from one CVS to another CVS in such situations, a flag, such as a no_output_of_prior_pics_flag is set not equal to one, such as when the values of pic_width_in_luma_samples, pic_height_in_luma_samples, and max_dec picture buffering equal the three respectively corresponding values as in the preceding CVS. Accordingly, a picture in the DPB is signalled to be repeated for output and the corresponding HRD operation is specified.

In one embodiment, a signalling may be provided to convey repeated picture output and the corresponding HRD operation when fixed_pic_rate_flag is equal to one. The signalling indicating repeated picture output provides a mechanism for proper HRD operation of a CVS corresponding to a source with a picture rate lower than the intended fixed picture output rate, such as when the source corresponds to 24 Hz film content. The signaling of the repeated picture output may also provide a mechanism for DPB management when a bitstream transitions from a first CVS to a second CVS, such as when the no_output_of_prior_pics_flag is not equal to one, and the fixed picture output rate does not change (i.e., remains equal to one).

In one embodiment, when fixed_pic_rate_flag=1 in a CVS of the bitstream, the repeat_pic_output_flag associated with a picture signals the presence of corresponding repeat picture output information for the picture.

In one embodiment, when repeat_pic_output_flag is equal to 1, a pic_out_idx is present and provides an indication of presence of a table, such as Table 5 (presented in later part of the disclosure) that specifies picture output repetition pattern for the picture. The corresponding HRD operation is also specified in later part of this specification.

In a first example embodiment, in a CVS, if fixed_pic_rate_flag=1, and pic_output_flag is not present, then the pic_output_flag may be inferred to be equal to 1. Each decoded picture may be output at least once. The pic_out_idx may be specified as a u(4) but it could be u(3) if deemed that three bits are adequate. These parameters may be provided in a portion of a slice header, which as a non-limiting example may be the relevant slice header syntax in Table 2 which includes pic_output_flag and the pic_out_idx. pic_out_idx is in accordance to Table 5

In the first example embodiment, in a CVS if fixed_pic_rate_flag=1, then repeat_pic_output_flag is present, as shown in Table 2. The value of repeat_pic_output_flag may be 0 or 1. When the value of repeat_pic_output_flag equal to 1, it specifies that the pic_out_idx is present. When the value of the repeat_pic_output_flag is equal to 0, it specifies that pic_out_idx is not present. In a CVS, when repeat_pic_output_flag is not present, its value may be inferred to be equal to 0. The repeat_pic_output_flag has the same value in all slices of the picture. The pic_out_idx specifies the picture output repetition pattern for the picture, such as indicated by Table 5. When pic_out_idx is not present, its value is inferred equal to 0. The pic_out_idx has the same value in all slices of the picture. If fixed_pic_rate_flag=1, output_flag_present_flag, such as provided in the picture parameter set is irrelevant.

In one embodiment, the presence of the output_flag_present_flag in the picture parameter set is contingent to fixed_pic_rate_flag=0 as shown below in Table 1 (relevant Picture parameter set RSBP syntax).

TABLE 1

| if (!fixed_pic_rate_flag) | |
| output_flag_present_flag | u(1) |

TABLE 2

| slice_header( ) { | Descriptor |
| --- | --- |
| first_slice_in_pic_flag | u(1) |
| pic_parameter_set_id | ue(v) |
| if( !first_slice_in_pic_flag ) | |
| slice_address | u(v) |
| if( dependent_slice_enabled_flag && !first_slice_in_pic_flag ) | |
| dependent_slice_flag | u(1) |
| if( !dependent_slice_flag ) { | |
| slice_type | ue(v) |
| if (fixed_pic_rate_flag) { | |
| repeat_pic_output_flag | u(1) |
| if (repeat_pic_output_flag) | |
| pic_out_idx | u(4) |
| } | |
| else if (!fixed_pic_rate_flag) { | |
| if( output_flag_present_flag ) | |
| pic_output_flag | u(1) |
| } | |
| if( separate_colour_plane_flag == 1 ) | |
| colour_plane_id | u(2) |
| if( RapPicFlag ) { | |
| rap_pic_id | ue(v) |
| no_output_of_prior_pics_flag | u(1) |
| } | |

In a second example embodiment, the syntax and semantics of the pic_output_flag are independent of the fixed_pic_rate_flag. The repeat_pic_output_flag is present only if fixed_pic_rate_flag=1 and pic_output_flag=1 since a picture that is not output would not require an output repetition specification. The repeat_pic_output_flag is present if the fixed_pic_rate_flag=1 and pic_output_flag=1. The repeat_pic_output_flag equal to 1 specifies that pic_out_idx is present. The repeat_pic_output_flag equal to 0 specifies that pic_out_idx is not present. When the repeat_pic_output_flag is not present, its value is inferred to be equal to 0. The repeat_pic_output_flag shall have the same value in all slices of the picture. The pic_out_idx indicates the entry of Table 5 that specifies the picture output repetition pattern for the picture. When the pic_out_idx is not present, its value is inferred equal to 0. The pic_out_idx shall have the same value in all slices of the picture. The relevant slice header syntax for a slice header which includes pic_output_flag and the pic_out_idx is provided in Table 3.

TABLE 3

| slice_header( ) { | Descriptor |
|---|---|
| first_slice_in_pic_flag | u(1) |
| pic_parameter_set_id | ue(v) |
| if( !first_slice_in_pic_flag ) | |
| slice_address | u(v) |
| if( dependent_slice_enabled_flag && | |
| !first_slice_in_pic_flag ) | |
| dependent_slice_flag | u(1) |
| if( !dependent_slice_flag ) { | |
| slice_type | ue(v) |
| if( output_flag_present_flag ) | |
| pic_output_flag | u(1) |
| if (fixed_pic_rate_flag && pic_output_flag) { | |
| repeat_pic_output_flag | u(1) |
| if (repeat_pic_output_flag) | |
| pic_out_idx | u(4) |
| } | |
| if( separate_colour_plane_flag = = 1 ) | |
| colour_plane_id | u(2) |
| if( RapPicFlag ) { | |
| rap_pic_id | ue(v) |
| no_output_of_prior_pics_flag | u(1) |
| } | |

In a third example embodiment, the repeat_pic_output_flag is present if the fixed_pic_rate_flag=1, and the repeat_pic_output_flag does not depend on the syntax or semantics of pic_output_flag. If the fixed_pic_rate_flag is not equal to 1, the repeat_pic_output_flag is not present. The repeat_pic_output_flag equal to 1 may also specify that the pic_out_idx is present. The repeat_pic_output_flag equal to 0 specifies that pic_out_idx is not present. When repeat_pic_output_flag is not present, its value is inferred to be equal to 0. The repeat_pic_output_flag may have the same value in all slices of the picture. The pic_out_idx may indicates the entry of Table 5 that specifies the picture output repetition pattern for the picture. When pic_out_idx is not present, its value may be inferred to be equal to 0. The pic_out_idx may also have the same value in all slices of the picture. The relevant slice header syntax for a slice header which includes pic_output_flag and the pic_out_idx is provided in Table 4.

TABLE 4

| slice_header( ) { | Descriptor |
|---|---|
| first_slice_in_pic_flag | u(1) |
| pic_parameter_set_id | ue(v) |
| if( !first_slice_in_pic_flag ) | |
| slice_address | u(v) |
| if( dependent_slice_enabled_flag && | |
| !first_slice_in_pic_flag ) | |
| dependent_slice_flag | u(1) |
| if( !dependent_slice_flag ) { | |
| slice_type | ue(v) |
| if (fixed_pic_rate_flag) { | |
| repeat_pic_output_flag | u(1) |
| if (repeat_pic_output_flag) | |
| pic_out_idx | u(4) |
| } | |
| if( output_flag_present_flag ) | |
| pic_output_flag | u(1) |
| if( separate_colour_plane_flag = = 1 ) | |
| colour_plane_id | u(2) |
| if( RapPicFlag ) { | |
| rap_pic_id | ue(v) |
| no_output_of_prior_pics_flag | u(1) |
| } | |

In one embodiment, if for a CVS, the fixed_pic_rate_flag=1, a picture is output at each successive clock tick, $t_c$. The output of some pictures of the CVS may need to be repeated, such as when the rate of the coded pictures in the CVS is less than a fixed picture rate expressed by the number of clock ticks per second.

TABLE 5

| pic_out_idx | Description | Output times Of picture n | final_pic_out |
|---|---|---|---|
| 0 | picture n is output once if picture $n_n$ is output at the next clock tick. DiffPicOrderCnt($n_n$, n) = $t_c$ | PicOrderCntVal (n) | 0 |
| 1 | picture n is output twice in two consecutively clock ticks. DiffPicOrderCnt($n_n$, n) = 2* $t_c$ | PicOrderCntVal (n), PicOrderCntVal + $t_c$ | 1 |
| 2 | picture n is output twice at the first and third of three consecutively clock ticks. picture $n_n$ is output at the second of three consecutively clock ticks. DiffPicOrderCnt($n_n$, n) = $t_c$ DiffPicOrderCnt($n_{n+1}$, n) = 3* $t_c$ | PicOrderCntVal, PicOrderCntVal + (2* $t_c$) | 2 |
| 3 | picture n is output thrice in three consecutively clock ticks. DiffPicOrderCnt($n_n$, n) = 3* $t_c$ | PicOrderCntVal, PicOrderCntVal + $t_c$ PicOrderCntVal + (2* $t_c$) | 2 |
| 4 ... 15 | Reserved | | |

In one embodiment, the fixed_pic_rate_flag equal to 1 may indicate that a temporal distance between any two consecutive HRD output times is constrained as follows. The fixed_pic_rate_flag equal to 0 may indicate that no such constraints apply to the temporal distance between the HRD output times of any two consecutive pictures in output order.

In one embodiment, when the fixed_pic_rate_flag is not present in the CVS, it is inferred to be equal to 0. When the fixed_pic_rate_flag is equal to 1 for a CVS containing picture n, the temporal distance between any two consecutive HRD output times may be equal to $t_c$ as specified in the HRD of the video coding specification, for example, as in AVC/H.264. The value computed for $\Delta t_{o,dpb}(n)$ is specified in Equation C-13 when one or more of the following conditions are true for the following picture $n_n$ that is specified for use in Equation C-13:

picture $n_n$ is in the same coded video sequence as picture n.

picture $n_n$ is in a different coded video sequence and fixed_pic_rate_flag is equal to 1 in the coded video sequence containing picture $n_n$ and the value of num_units_in_tick×time_scale is the same for both coded video sequences.

In one embodiment, if the fixed_pic_rate=1, all the decoding units of each access unit are decoded during the same clock tick. Moreover, all pictures k in the DPB, for which all of the following conditions are true, are removed from the DPB:

picture k is marked as "unused for reference", picture k has PicOutputFlag equal to 0 or marked no longer needed for output When a picture is removed from the DPB, the DPB fullness is decremented by one. For each picture n that is output and is not the last picture in the bitstream that is output, the final DPB output time of a picture n may be specified by the following equation:

$$t_{fi,dpb}(n) = t_{o,dpb}(n) + \text{FinalClkTick}(n) * t_c$$

where:

$t_{o,dpb}(n)$ is the first DPB output time of picture n, $t_{fi,dpb}(n)$ is the final DPB output time of picture n, FinalClkTick(n) is the number of clock ticks added to obtain the final picture output time of picture n, and FinalClkTick(n)=final_pic_out In one embodiment, if $n_n$ indicates a picture in a CVS that follows picture n in output order that has PicOutputFlag equal to 1. If the DiffPicOrderCnt($n_n$, n) is greater $t_c$, final_pic_out is specified in table 5 as the entry corresponding to the value of pic_out_idx. If pic_out_idx is not present, the value of pic_out_idx for picture n is inferred equal to 0 and final_pic_out equals zero. The value of $\Delta t_{o,dpb}(n)$ is defined as follows for all values of pic_out_idx<4.

If FinalClkTick(n) is not equal to 2:

$$\Delta t_{o,dpb}(n) = t_{o,dpb}(n_n) - t_{o,dpb}(n) = t_c * (1 + \text{final\_pic\_out}) \quad (C-13)$$

Else if FinalClkTick(n) is equal to 2:

$$\Delta t_{o,dpb}(n) = t_{o,dpb}(n_n) - t_{o,dpb}(n) = t_c,$$

$$\Delta t_{o,dpb}(n_n) = t_{o,dpb}(n_{n+1}) - t_{o,dpb}(n_n) = t_c, \text{ and}$$

$$\text{DiffPicOrderCnt}(n_{n+1}, n) = t_c * (1 + \text{final\_pic\_out}) = 3 * t_c$$

where $n_{n+1}$ indicates the picture in the CVS that follows picture $n_n$ in output order and has PicOutputFlag equal to 1.

For all pictures k in the DPB, mark picture k "no longer needed for output" if the final output time of picture k, $t_{fi,dpb}(k)$, as specified by C-11 (in Subclause C.3.2), is less than or equal to the CPB removal time of the first decoding unit (denoted as decoding unit m) of the current picture n; i.e., $t_{fi,dpb}(k) \leq t_r(m)$.

If the final output time of the current output picture p, $t_{fi,dpb}(p) > t_r(m)$, the CPB removal time of the first decoding unit in the next picture is incremented by $t_c$. In an embodiment all of the above two paragraphs is performed at the start of Timing of decoding unit removal and decoding of decoding unit.

Embodiments of the present invention may be generally implemented as part of a subscriber television system such as a digital broadband delivery system (DBDS) or cable television system (CTS). For example, a subscriber television system (STS) and its operation will be described initially, with the understanding that other conventional data delivery systems are within the scope of the preferred embodiments of the present invention. FIG. 1A shows a block diagram view of a subscriber television system (STS) 10, which is generally a high quality, reliable and integrated network system that is preferably capable of delivering video, audio, voice and data services to digital home communication terminals (DHCTs) 16. Although FIG. 1A depicts a high level view of a CTS 10, it should be appreciated that a plurality of subscriber television systems can tie together a plurality of regional networks into an integrated global network so that DHCT users can receive media content provided from anywhere in the world.

Further, it will be appreciated that the STS 10 shown in FIG. 1A is merely illustrative and should not be construed as implying any limitations upon the scope of the preferred embodiments of the present invention. For instance, subscriber television systems also included within the scope of the embodiments of the invention include systems not utilizing physical structured cabling for transmission, such as, but not limited to, satellite systems. Further, transmission media included within the scope of the preferred embodiments of the invention include, but are not limited to, hybrid fiber/coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 preferably delivers broadcast video signals as digitally formatted signals in addition to delivering traditional broadcast analog video signals. Furthermore, the system can preferably support one way broadcast services as well as both one-way data services and two-way media content and data services. The two-way operation of the network preferably allows for user interactivity with services, such as Pay-Per-View programming, Near Video-On-Demand (NVOD) programming according to any of several known NVOD implementation methods, View-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1A, a typical STS 10 comprises a head end 11, hubs 12, an HFC access network 17, and DHCTs 16. It should be appreciated that although a single component (e.g. a head end) is illustrated in FIG. 1A, a STS 10 can feature a plurality of any one of the illustrated components or may be configured with alternative embodiments for any one of the individual components or with yet other additional components not enumerated above.

Media content provided by one or more content providers (not shown) is communicated by the content providers to one or more head ends 11. From those head ends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which, in one implementation, is connected to a network interface unit (NIU) 15 which is connected to a digital home communication terminal (DHCT) 16. In other implementations, the HFC node 13 is connected directly to a DHCT 16. The NIU 15, when implemented, is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers. As the high-level operations of many of the functions of a subscriber television system (STS) 10 are well known to those of ordinary skill in the art, further high level description of the overall STS 10 of FIG. 1A will not be contained herein.

FIG. 1B is a block diagram illustrating the transmission signals supported by the STS 10 (FIG. 1A), where the transmission signals 60, 64, 68, 72 and 76 are input into a DHCT 16 in accordance with embodiments of the invention. Preferably, one or more content providers (not shown) provide the content that is included in the transmission signals. Transmission signals can be generated at a headend 11 or at a hub 12 (FIG. 1A) that might function as a mini-headend and which therefore possesses some of the headend functionality. In some implementations, the transmission signals can be provided by one or more of the content providers.

As depicted in FIG. 1B, the STS 10 (FIG. 1A) can simultaneously support a number of transmission signal types, transmission rates, and modulation formats. The ability to carry analog and digital signals over a large bandwidth are characteristics of a Hybrid Fiber/Coax (HFC) Network typically employed in a STS, as in the STS 10 of FIG. 1A. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, a STS 10 using HFC supports downstream (i.e., in the direction from the headend 11 to the DHCT 16) frequencies from 50 MHz to 870 MHz, whereas upstream frequencies (i.e., in the direction from the DHCT 16 to higher levels of the system) are in the 5 MHz to 42 MHz band. Generally, the RF bandwidth spacing for analog and digital services is 6 MHz. Furthermore, for a typical 870 MHz system in the U.S., a possible downstream RF spectrum subdivision plan uses 6 MHz spaced frequency subdivisions, or spans, within the 50 MHz to 550 MHz band for analog video transmission signals and within the 550 MHz to 870 MHz range for digital transmission signals. The Analog Transmission Signals (ATSS) 60 shown in FIG. 1B are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio.

Referring again to FIG. 1B, the downstream direction transmission signals, having been multiplexed, and in embodiments using frequency division multiplexing (FDM), are often referred to as in-band transmission signals and include Analog Transmission Signals (ATSs) 60 and Digital Transmission Signals (DTS) 64, 68, 72 (also known as Digital Transport Signals). These transmission signals carry video, audio and data services. For example, these transmission signals may carry television signals, Internet data, or any additional types of data, such as Electronic Program Guide (EPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 60, the DTCs 64, 68, 72 each occupies 6 MHz of the RF spectrum. However, the DTSs 64, 68, 72 are digital transmission signals consisting of 64- or 256-Quadrature Amplitude Modulated (QAM) digital signals formatted as MPEG-2 transport streams, allocated in a separate frequency range. As will be described in more detail below, the MPEG-2 transport stream enables transmission of a plurality of DTS types over each 6 MHz RF spacing, as compared to a 6 MHz ATSk. The three types of digital transport signals illustrated in FIG. 1B include broadcast digital transmission signals 64, carousel digital transmission signals 68, and on-demand transmission signals 72.

MPEG-2 transport may be used to multiplex video, audio, and data in each of these Digital Transmission Signals (DTSs). However, because an MPEG-2 transport stream allows for multiplexed video, audio, and data into the same stream, the DTSs do not necessarily have to be allocated in separate 6 MHz RF frequencies, unlike ATSs 60. On the other hand, each DTS is capable of carrying multiple broadcast digital media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal can carry the video and audio streams of the media content instances of multiple television (TV) stations, as well as media content and data that is not necessarily related to those TV media content instances, as compared to one TV channel broadcast over one ATS 60 that consumes the entire 6 MHz. The digital data is inserted into MPEG-2 transport streams carried through each 6 MHz frequency subdivision assigned for digital transmission, and then de-multiplexed at the subscriber DHCT so that multiple sets of data can be produced within each tuned 6 MHz frequency span, or subdivision.

Although broadcast in nature, the carousel DTSs 68 and on-demand DTSs 72 offer different functionality. Continuing with FIG. 1B, the broadcast DTSs 64 and carousel DTSs 68 typically function as continuous feeds for indefinite time, whereas the on-demand DTSs 72 are continuous feeds sessions for a limited time. All DTS types are capable of being transmitted at high data rates. The broadcast DTSs 64 carry typical data comprising multiple digitally-video encoded and formatted TV source signals and other continuously fed data information. The carousel DTSs 68 carry broadcast media content or data that is systematically broadcast in a cycling fashion but updated and revised as needed. Thus, the carousel DTSs 68 serve to carry high volume data such as media content and data and possibly, other data at high data rates. The carousel DTSs 68 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 72, on the other hand, can carry particular information such as compressed video and audio pertaining to subscriber requested media content instance preview and/or media content instance descriptions, as well as other specialized data information.

The User-to-Network Download Protocol of the MPEG-2 standard's DSM-CC specification (Digital Storage Media—Command and Control) provides the data carousel protocol used for broadcasting data from a server located at headend 11, or elsewhere. It also provides the interactive download protocol for reliable downloading of data from a server (possibly the same server) to an individual DHCT through the on-demand DTSs. Each carousel and on-demand DTS is defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 1B are Out-Of-Band (OOB) signals that provide continuously available two-way signaling to the subscribers' DHCT 16 regardless of which in-band signals are tuned to by the individual DHCT in-band tuners, as described below. The OOB signals consists of a Forward Data Signal (FDS) 76 and a Reverse Data Signal (RDS) 80. The OOB signals can comply to any one of a number of well known transport protocols but preferably comply to either a DAVIC 1.1 Transport Protocol with FDS of 1.544 mega-bits per second (Mbps) or more using quadrature phase shift keying (QPSK) modulation and an RDS of 1.544 Mbps or more using QPSK modulation, or to a DOCSIS Transport Protocol with FDS of 27 Mbps using 64-QAM modulation and a RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

FIG. 2 is an overview of a headend 11, which provides the interface between the STS 10 and the service and content providers. The overview of FIG. 2 is equally applicable to a hub 12, and the same elements and principles may be implemented at a hub 12 instead of the headend 11 as described herein. The headend 11 receives content from a variety of service and content providers, which can provide input in a variety of ways. The headend 11 combines the content from the various sources and distributes the content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown). The headend 11 can also receive content from a direct feed source 210 via a direct line 212. Other input sources from content providers include a video camera 214, analog input source 208, or an application server 216. The application server 216 may include more than one line of communication. One or more components such as analog input source 208, input source 210, video camera 214, and application server 216 can be located external to the headend 11, as shown, or internal to the headend as would be appreciated by one having ordinary skill in the art. The signals provided by the content or programming input sources can include a single media content instance (i.e. individual instances of media content such as an episode of a television show, a movie, or web-page, etc.) or a multiplex that includes several media content instances.

The headend 11 generally includes one or more receivers 218 that are each associated with a content source. Video encoders, such as encoder 220, are included for digitally encoding at least some local programming or a real-time feed from video camera 214, or the like. The video encoder 220 outputs the respective compressed video and audio streams corresponding to the analog audio/video signal received at its input. For example, video encoder 220 can output bitstreams packetized elementary (PES) streams or transport streams compliant to the syntax and semantics of the transport portion of the ISO MPEG-2 Systems specification, respectively. The PES or transport streams may be multiplexed with input signals from switch 230, receiver 218 and control system 232. The multiplexing logic 222 processes the input signals and multiplexes at least a portion of the input signals into transport stream 240.

Analog input source 208 can provide an analog audio/video broadcast signal, which can be input into modulator 227. From modulator 227, a modulated analog output signal can be combined at combiner 246 along with other modulated signals for transmission into transmission medium 250. Alternatively, analog audio/video broadcast signal from analog input source 208 can be input into modulator 228. Alternatively, analog audio/video broadcast signal can be input directly from modulator 227 to transmission medium 250. The analog broadcast media content instances are transmitted via respective radio-frequency (RF) channels, each assigned for transmission of an analog audio/video signal such as NTSC video, as described in association with FIG. 1B.

The switch, such as asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers may download content to an application server located within the STS 10. The application server 216 may also be located within the headend 11 or elsewhere within the STS 10, such as in a hub 12. The various inputs into the headend 11 are then combined with the other information from the control system 232, which is specific to the STS 10, such as local programming and control information, which can include among other things conditional access information. The headend 11 contains one or more modulators 228 to convert the received transport streams 240 into modulated output signals suitable for transmission over the transmission medium 250 through the network 18. Each modulator 228 may be a multimodulator including a plurality of modulators, such as, but not limited to, QAM modulators, that radio frequency modulate at least a portion of the transport streams 240 to become output transport streams 242. The output signals 242 from the various modulators 228 or multimodulators are combined, using equipment such as a combiner 246, for input into the transmission medium 250, which is sent via the in-band delivery path 254 to subscriber locations (not shown). In-band delivery path 254 can include DTSs 64, 68, 72, and ATS 60, as described with FIG. 1B. In one example, the server 216 also provides various types of data 288 to the headend 11.

The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the content distributed to subscribers. Information, such as conditional access information, is communicated from the control system 232 to the multiplexing logic 222 where it is multiplexed into a transport stream 240.

Among other things, the control system 232 provides input to the modulator 228 for setting the operating parameters, such as selecting certain media content instances or portions of transport streams for inclusion in one or more output transport streams 242, system specific MPEG table packet organization, and/or conditional access information. Control information and other data can be communicated to hubs 12 and DHCTs 16 via an in-band delivery path 254 or via an out-of-band delivery path 256.

The out-of-band data is transmitted via the out-of-band FDS 76 (FIG. 1B) of transmission medium 250 by means such as, but not limited to, a Quadrature Phase-Shift Keying (QPSK) modem array 226. Two-way communication utilizes the RDS80 (FIG. 1B) of the out-of-band delivery path 256. Hubs 12 and DHCTs 16 transmit out-of-band data through the transmission medium 250, and the out-of-band data is received in headend 11 via out-of-band RDS80. The out-of-band data is routed through router 264 to an application server 216 or to control system 232. The out-of-band control information includes such information as a pay-per-view purchase instruction and a pause viewing command from the subscriber location to a video-on-demand type application server located internally or external to the headend 11, such as application server 216, as well as any other data sent from the DHCT 16 (FIG. 1A) or hubs 12, all of which will preferably be properly timed. The control system 232 also monitors, controls, and coordinates all communications in the subscriber television system, including video, audio, and data. The control system 232 can be located at headend 11 or remotely.

The transmission medium 250 distributes signals from the headend 11 to the other elements in the subscriber television system, such as a hub 12, a node 13, and subscriber locations (FIG. 1A). The transmission medium 250 can incorporate one or more of a variety of media, such as optical fiber, coaxial cable, and hybrid fiber-coax (HFC), satellite, direct broadcast, or other transmission media.

Figure 3:
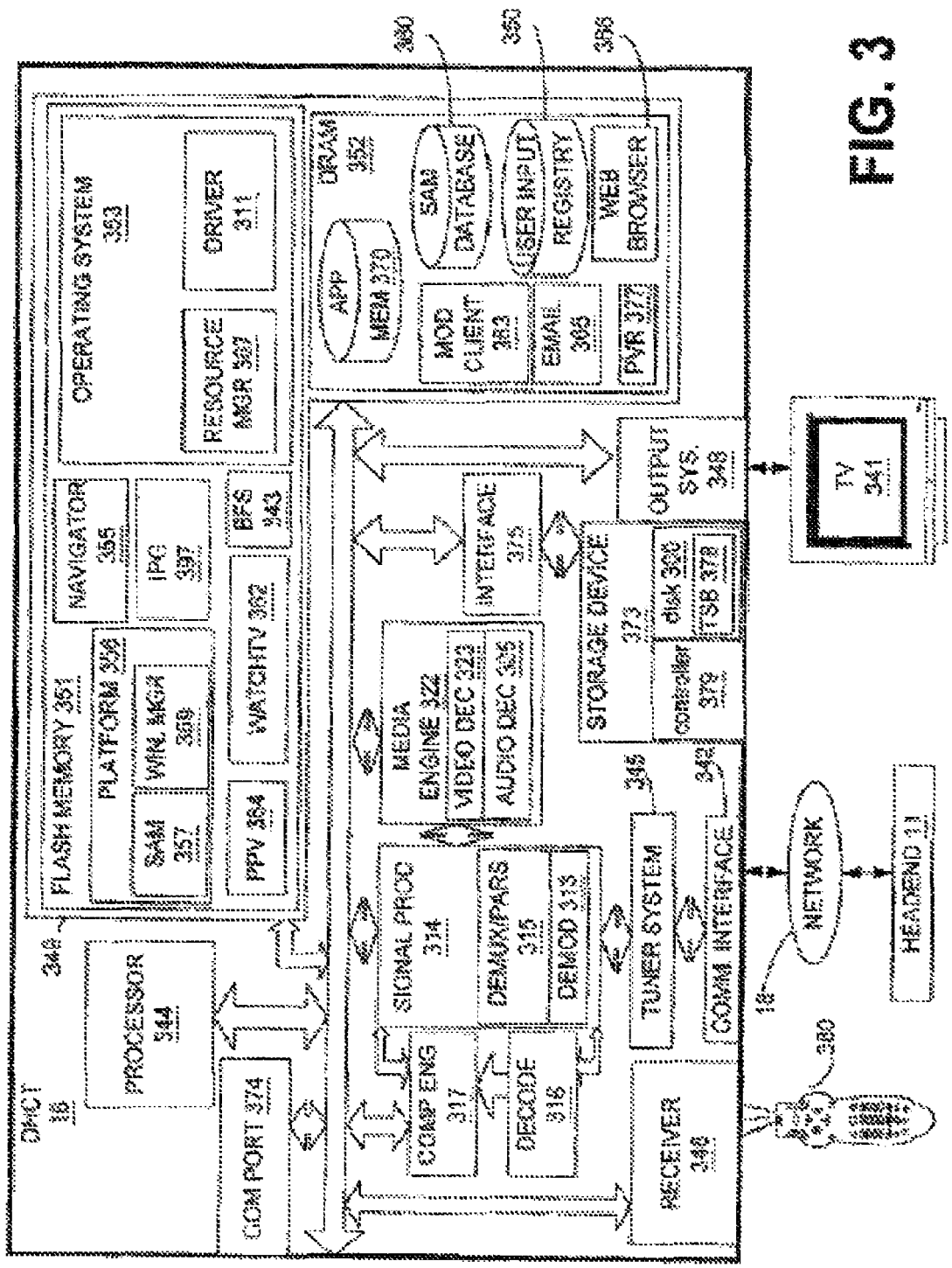
FIG. 3 is a block diagram illustration of a DHCT 16 that is coupled to a headend and to a television.

FIG. 3 is a block diagram illustration of a DHCT 16 that is coupled to a headend 11 and to a television, in accordance with one implementation. It will be understood that the DHCT 16 shown in FIG. 3 is merely illustrative and should not be construed as implying any limitations upon the scope of the preferred embodiments of the invention. For example, some of the functionality performed by applications executed in the DHCT 16 (such as the MOD client application 363) may instead be performed at the headend 11 and vice versa, or not at all in some embodiments. A DHCT 16 is typically situated at a user's residence or place of business and may be a stand alone unit or integrated into another device such as, for example, a television set or a personal computer or other display devices or an audio device. The DHCT 16 preferably includes a communications interface 342 for receiving signals (video, audio and/or other data) from the headend 11 through the network 18 and for providing any reverse information to the headend 11 through the network 18.

The DHCT 16 further preferably includes at least one processor 344 for controlling operations of the DHCT 16, an output system 348 for driving the television display 341, and a tuner system 345 for tuning into a particular television channel or frequency to be displayed and for sending and receiving various types of data or media content to and from the headend 11. The DHCT 16 may include, in other embodiments, multiple tuners for receiving downloaded (or transmitted) media content. Tuner system 345 can select from a plurality of transmission signals (FIG. 1B) provided by the subscriber television system. Tuner system 345 enables the DHCT 16 to tune to downstream media and data transmissions, thereby allowing a user to receive digital or analog media content delivered in the downstream transmission via the subscriber television system. The tuner system 345 includes, in one implementation, an out-of-band tuner for bi-directional quadrature phase shift keying (QPSK) data communication and a quadrature amplitude modulation (QAM) tuner (in band) for receiving television signals. Additionally, a receiver 346 receives externally-generated information, such as user inputs or commands from an input device or other devices.

According to another embodiment of the invention, a telephone modem (not shown) in the DHCT 16 can be utilized for upstream data transmission and a headend 11, hub 12 (FIG. 1A) or other component located upstream in the STS 10 (FIG. 1A) can receive data from a telephone network corresponding with the telephone modem and can route the upstream data to a destination internal or external to the STS 10, such as an application data server in the headend 11 or content provider.

The DHCT 16 includes signal processing system 314, which comprises demodulating system 313 and transport demultiplexing and parsing system 315 (herein demultiplexing system) to process broadcast media content and/or data. One or more of the systems of signal processing system 314 can be implemented with software, a combination of software and hardware, or preferably in hardware. Demodulating system 313 comprises functionality for RF signal demodulation, either an analog transmission signal or a digital transmission signal. For instance, demodulating system 313 can demodulate a digital transmission signal in a carrier frequency that was modulated, among others, as a QAM-modulated signal. When tuned to a carrier frequency corresponding to an analog TV signal transmission, demultiplexing system 315 is bypassed and the demodulated analog TV signal that is output by demodulating system 313 is instead routed to analog video decoder 316. Analog video decoder 316 converts the analog video signal (i.e. the video portion of a media content instance that comprises a video portion and an audio portion) received at its input into a respective non-compressed digital representation comprising a sequence of digitized pictures and their respective digitized audio. Presented at the input to analog video decoder 316 is an analog video signal such as NTSC video comprising of audio and video. In one implementation, the video consists of a sequence of fields spaced apart at approximately one-sixtieth of a second. A pair of consecutive fields constitutes a picture. The odd field contains the odd-numbered lines of the picture and the even field contains the even-numbered lines of the picture. Analog video decoder 316 outputs the corresponding sequence of digitized pictures and respective digitized audio. Each picture is a two dimensional entity of picture elements and each picture element contains a respective set of values. A picture element value comprises luminance and chrominance information that are representative of brightness and color information at the spatial location of the picture element within the picture.

Digitized pictures and respective audio output by analog video decoder 316 are presented at the input of compression engine 317. Digitized pictures and respective audio output by analog video decoder 316 can also be presented to an input of media engine 322 via an interface (not shown) dedicated for non-compressed digitized analog video and audio, such as ITU-656, for display on TV 341. Compression engine 317 is coupled to localized memory 349, preferably DRAM 352, for input and processing of the input digitized pictures and their respective digitized audio. Alternatively, compression engine 317 can have its own integrated memory (not shown). Compression engine 317 processes the sequence of digitized pictures and digitized audio and converts them into a video compressed stream and an audio compressed stream, respectively. The compressed audio and video streams are produced in accordance with the syntax and semantics of respective audio and video coding specifications so that they can be interpreted by respectively compliant video decoder 323 and audio decoder 325 for decompression. Each compressed stream consists of a sequence of data packets containing a header and a payload. Each header contains a unique program identification, or PID, associated with the respective compressed stream.

Compression engine 317 multiplexes the audio and video compressed streams into a transport stream, such as an MPEG-2 transport stream, for output. Furthermore, compression engine 317 can preferably compress audio and video corresponding to more than one program in parallel (e.g., two tuned analog TV signals) and to multiplex the respective audio and video compressed streams into a single transport stream. Output of compressed streams and/or transport streams produced by compression engine 317 is input to signal processing system 314. Parsing capabilities 315 within signal processing 314 allow for interpretation of sequence and picture headers, for instance, annotating their locations within their respective compressed stream for future retrieval from storage device 373. A compressed analog media content instance (e.g., TV program episode or show) corresponding to a tuned analog transmission channel can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 for its display on TV 341, as will be described below.

Demultiplexing system 315 can include MPEG-2 transport demultiplexing. When tuned to carrier frequencies carrying a digital transmission signal, demultiplexing system 315 enables the separation of packets of data, corresponding to the compressed streams of information belonging to the desired media content instances, for further processing. Concurrently, demultiplexing system 315 precludes packets in the multiplexed transport stream that are irrelevant or not desired, such as packets of data corresponding to compressed streams of media content instances of other media content signal sources (e.g. other TV channels), from further processing.

Parsing capabilities of demultiplexing system 315 include reading and interpreting the received transport stream without disturbing its content, such as to interpret sequence and picture headers, for instance, to annotate their locations within their respective compressed stream for future retrieval from storage device 373. Thus, the components of signal processing system 314 are capable of QAM demodulation, forward error correction, and demultiplexing transport streams, and parsing packetized elementary streams and elementary streams. A compressed media content instance corresponding to a tuned carrier frequency carrying a digital transmission signal can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 as will be described below.

One having ordinary skill in the art will appreciate that signal processing system 314 will preferably include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present invention, including analog signals (e.g. NTSC) that bypass one or more elements of the signal processing system 314 and are forwarded directly to the output system 348. Further, outputs presented at corresponding next-stage inputs for the aforementioned signal processing flow may be connected via accessible memory 349 in which the outputting device stores the output data and the inputting device thereafter inputs the output data written to memory 349 by the respective outputting device. Outputting and inputting devices include analog video decoder 316, compression engine 317, media engine 322, signal processing system 314, and components or subcomponents thereof. Further, it will be understood by those having ordinary skill in the art that components of signal processing system 314 can be spatially located in different areas of the DHCT 16. Further, it will be understood by those having ordinary skill in the art that, although the components of signal processing system 314 are illustrated as being in communication with an incoming signal from the communications interface 342, the signal may not necessarily be in the order shown for all signals.

The DHCT 16 also includes media engine 322, which includes digital video decoder 323 also known as video decompression engine, and digital audio decoder 325 also known as audio decompression engine, and other digital signal processing components not shown, as would be appreciated by those having ordinary skill in the art. For example, demultiplexing system 315 is in communication with tuner system 345, and processor 344 to effect reception of digital compressed video streams, digital compressed audio streams, and data streams corresponding to one or more media content instances to be separated from other media content instances and/or streams transported in the tuned transmission channel and to be stored in a first part (not shown) of DRAM 352 of DHCT 16 assigned to receive packets of one or more media content instances. Other dedicated memory may also be used for media content instance packets.

Furthermore, while conducting this process, demultiplexing system 315 demultiplexes and separates desired compressed streams from the received transport stream without disturbing its content. Further, parser 315 parses (i.e., reads and interprets) compressed streams such as to interpret sequence headers and picture headers, and deposits a transport stream carrying compressed streams of a media content instance into DRAM 352. Processor 344 causes transport stream in DRAM 352 to be transferred to the storage device 373 via interface 375. Under program control by processor 344, the demultiplexing system 315 in communication with the digital video decoder 323, storage device 373, and processor 344 effect notification and/or transfer of received packets of one or more compressed streams corresponding to one or more media content instances from a first part of DRAM 352 to a second part (not shown) of DRAM 352 assigned to the digital video decoder 323 and the digital audio decoder 325. Alternatively, media engine 322 can have access to a dedicated localized DRAM (not shown). Upon demultiplexing and parsing the transport stream carrying one or more media content instances, signal processing system 314 outputs to DRAM 352 ancillary data in the form of a table or data structure (not shown) comprising the relative or absolute location of the beginning of certain pictures in the compressed media content instance for convenience in retrieval during future operations.

In one implementation, compression engine 317 can output bitstreams containing CVSes that are packetized elementary streams (PES) inside a transport stream, such as according to the syntax and semantics of the ISO MPEG-2 Systems specification. The bitstreams output by compression engine 317 corresponding to a first media content instance are deposited in local memory for compression engine 317 and routed to demultiplexing system 315. Demultiplexing system 315 parses (i.e., reads and interprets) the transport stream generated by compression engine 317 without disturbing its content, such as to interpret picture headers, and deposits the transport stream into DRAM 352. Processor 344 causes transport stream in DRAM 352 to be transferred to the storage device 373. While parsing the transport stream, demultiplexing system 315 outputs to memory 352 ancillary data in the form of a table or data structure (not shown) comprising the relative or absolute location of the beginning of certain pictures in the compressed media content stream for the first media content instance for convenience in retrieval during future operations. In this way, random access operations such as fast forward, rewind, and jumping to a location in the compressed media content instance can be attained.

In another implementation, according to a plurality of tuners, a respective number of analog video decoders 316, and a respective number of compression engines 317, the aforementioned compression of analog video and audio is performed and routed to hard disk 300 of the storage device 373 simultaneously for a respective number of analog media content instances. Alternatively, a single compression engine with sufficient processing capabilities can serve to compress more than one analog media content instance.

The DHCT 16 may also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 380 or keyboard that includes user-actuated buttons.

In one implementation, the DHCT 16 includes system memory 349, which includes FLASH memory 351 and dynamic random access memory (DRAM) 352, for storing various applications, modules and data for execution and use by the processor 344. Basic functionality of the DHCT 16 is provided by an operating system 353 that is primarily stored in FLASH memory 351. Among other elements, the operating system 353 includes at least one resource manager 367 that provides an interface to resources of the DHCT 16 such as, for example, computing resources. Also included within operating system 353 is one or more device drivers that provides operating instructions to an internal or external storage device, such as storage device 373, and peripheral devices not shown. For example, device driver 311 provides operating instructions to the storage device controller 379 of the storage device 373 to effect, among other functions, read and/or write operations to the hard disk of the storage device 373.

One or more programmed software applications, herein referred to as applications, or application clients, are executed by utilizing the computing resources in the DHCT 16. The applications may be resident in FLASH memory 351 or downloaded into DRAM 352. Applications stored in FLASH memory 351 or DRAM 352 are executed by processor 344 (e.g., a central processing unit or digital signal processor) under the auspices of the operating system 353. Data required as input by an application is stored in DRAM 352 or FLASH memory 351 and read by processor 344 as need be during the course of the application's execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by processor 344 during the course of the application's execution. DRAM 352 also includes application memory 370 that various applications may use for storing and/or retrieving data.

An application referred to as navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu.

The FLASH memory 351 also contains a platform library 356. The platform library 356 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3 are a window manager 359 and a service application manager (SAM) client 357.

The window manager 359 provides a mechanism for implementing the sharing of the screen regions and user input. The window manager 359 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 16 should receive data corresponding to the input key and in which order. As an application is executed, it registers a request to receive certain user input keys or commands. When the user presses a key corresponding to one of the commands on the remote control device 380, the command is received by the receiver 346 and relayed to the processor 344. The processor 344 dispatches the event to the operating system 353 where it is forwarded to the window manager 359 which ultimately accesses the user input registry 350 and routes data corresponding to the incoming command to the appropriate application.

The SAM client 357 is a client component of a client-server pair of components, with the server component (not shown) being located on the headend 11, preferably in the control system 232 (FIG. 2). A SAM database 360 (i.e. structured data such as a database or data structure) in DRAM 352 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 362), pay-per-view events (available through a PPV application 364), digital music (not shown), media-on-demand (available through an MOD application 363), and an interactive program guide (IPG) 397. In general, the identification of a service includes the identification of an executable application that provides the service along with a set of application-dependent parameters that indicate to the application the service to be provided. As a non-limiting example, a service of presenting a television program (i.e. media content instance) could be executed by WatchTV application 362 with a set of parameters specifying the HBO to view HBO or with a separate set of parameters to view CNN. Each association of the application component (tune video) and one parameter component (HBO or CNN) represents a particular service that has a unique service I.D. The SAM client 357 also interfaces with the resource manager 367, as discussed below, to control resources of the DHCT 16.

Application clients can also be downloaded into DRAM 352 at the request of the SAM client 357, typically in response to a request by the user or in response to a message from the headend 11. In this example, DRAM 352 includes a media-on-demand application (MOD) 363, an e-mail application 365, PVR application 377, and a web browser application 366. It should be clear to one with ordinary skill in the art that these applications are not limiting and merely serve as examples for this present embodiment of the invention. Furthermore, one or more DRAM based applications may be resident, as an alternative embodiment, in FLASH memory 351. These applications, and others provided by the subscriber television system operator, are top-level software entities on the network for providing services to the user.

In one implementation, applications executing on the DHCT 16 work with the navigator 355 by abiding by several guidelines. First, an application utilizes the SAM client 357 for the provision, activation, and suspension of services. Second, an application shares DHCT 16 resources with other applications and abides by the resource management policies of the SAM client 357, the operating system 353, and the DHCT 16. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application client, or application, is designed to not have access to certain user input keys reserved by the navigator (i.e., power, channel+/−, volume+/−, etc.).

The MOD client application 363 provides the user with lists of available media content titles for each media content instance to choose from and with media content instances requested by the user. The MOD client application 363 provides media content instances to the user by engaging, preferably, in a direct two-way IP (Internet Protocol) connection with VOD content servers (not shown) that would be located, in one embodiment, in the headend 11 (FIG. 2).

An executable program or algorithm corresponding to an operating system (OS) component, or to a client platform component, or to an application client, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application client, or to respective parts thereof, can reside in FLASH memory 351, or in a local storage device (such as storage device 373) connected to DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

The DHCT 16 includes at least one storage device 373 to provide storage for downloaded media content. PVR application 377 (described in greater detail below), in cooperation with the operating system 353 and the device driver 311, effects, among other functions, read and/or write operations to the storage device 373. Herein, references to write and/or read operations to the storage device 373 will be understood to mean operations to the medium or media of the storage device 373 unless indicated otherwise. The device driver 311 is a software module preferably resident in the operating system 353. The device driver 311, under management of the operating system 353, communicates with the storage device controller 379 to provide the operating instructions for the storage device 373. As conventional device drivers and device controllers are well known to those of ordinary skill in the art, further discussion of the detailed working of each will not be described further here. Storage device 373 is preferably internal to DHCT 16, coupled to a common bus through a communication interface 375, preferably an integrated drive electronics (IDE) or small computer system interface (SCSI), although IEEE-1394 or USB, among others, can be used. Alternatively, the storage device 373 can be externally connected to (and thus removable from) the DHCT 16 via a communication port 374 implemented as IEEE-1394 or USB or as a data interface port such as a SCSI or an IDE interface. In one implementation, under the auspices of the real-time operating system 353 executed by processor 344, and in coordination with the PVR application client 377, transmitted media content (herein understood to also refer to other types of data in addition to, or instead of, media content instances) are received in DHCT 16 via communications interface 342 and stored in a temporary cache (not shown) in memory 349. The temporary cache is implemented and managed to enable media content transfers from the temporary cache to storage device 373, or, in concert with the insertion of a newly arriving media content into the temporary cache. In one implementation, the fast access time and high data transfer rate characteristics of the storage device 373 enable media content to be read from the temporary cache in memory 349 and written to storage device 373 in a sufficiently fast manner. Orchestration of multiple simultaneous data transfer operations is effected so that while media content is being transferred from the cache in memory 349 to storage device 373, new media content is received and stored in the temporary cache of memory 349.

Processor 344 in communication generally with device driver 311 and storage device controller 379 and demultiplexing system 315 effect retrieval of compressed video streams, compressed audio streams, and data streams corresponding to one or more media content instances from storage device 373. Retrieved streams are deposited in an output cache in storage device 373 and transferred to memory 352, and then processed for playback according to mechanisms that would be understood by those having ordinary skill in the art. In some embodiments, the media content instances are retrieved and routed from the hard disk 300 to the digital video decoder 323 and digital audio decoder 325 simultaneously, and then further processed for eventual presentation on a display device or other device.

Storage device 373 can be an optical storage device or a magnetic storage device, among others, and is preferably a hard disk drive. Storage device 373 comprises storage for media content that can be written to for storage and later read from for retrieval for presentation. The storage device 373 preferably includes at least one hard disk 300 and a controller 379, which receives operating instructions from the device driver 311 and implements those instructions to cause read and/or write operations to the hard disk 300. The operating system 353, in cooperation with the device driver 311, communicates with the storage device controller 379 to format the hard disk 300, causing the hard disk to be divided radially into sectors 301 and concentric circles called tracks 302.

The PVR application 377 provides for media content recording functionality by enabling the temporary writing to, and if requested, more permanent recording to the storage device 373. Through mechanisms explained below, media content received into the TSB 378 will have a temporary recording designation. That is, media content stored in clusters of the TSB 378 will have a temporary residence. This receiving of media content into the TSB 378 for temporary residence will also be referred to as buffering. The media content stored in the TSB 378 will either be deleted (i.e. its associated management file record will be deleted and the clusters storing the media content will be configured as writeable for eventual write operations that overwrite the media content within those clusters) or retained (through election by the user) as a permanent recording. A permanent recording will be understood to mean media content that is stored for an extended period of time as decided by the user. Permanent recordings are stored in non-buffer clusters (i.e. not in clusters of the TSB 378) that are not used for the TSB 378 in instances when the user elects in advance to make a scheduled recording of a media content instance that has not yet been tuned to at the DHCT 16. A permanent recording can also be achieved by selecting a media content instance stored in the TSB 378 and designating the media content instance as permanent. As will be described below, this designation can occur, in one implementation, by selecting the desired content via a user interface screen. The PVR application 377 responds by "flagging" the associated management file as permanent. This designation for the desired media content instance is relayed to the device driver 311 and/or operating system 353, which effects the removal of the associated clusters from the TSB 378. Thus, permanent recordings will preferably be more permanent than media content in the TSB 378, and permanent recordings can eventually be deleted from the disk space, typically at the explicit request of a user, as one example. This deletion occurs, in one implementation, by configuring the associated non-buffer clusters as writeable, and thus eventually available for the TSB 378 or scheduled recordings.

Media content may be transmitted or downloaded from a remote location, such as, for example, a remote server located in the head end 11, or from a home communication network, or from other consumer electronic devices. In accordance with the preferred embodiment, the PVR application 377 manages buffer space, or a time shift buffer (TSB) 378, of downloaded media content instances, or programs (content), and/or data, at the application level for each tuner. Hence, each tuner in tuner system 345 has a respective TSB 378. Note that buffering is understood to mean temporarily receiving media content, resulting either from reception of a broadcast digital channel or a digital compressed version of a broadcast analog channel, and/or data into the buffer space, or TSB 378, of the storage device 373. In one embodiment, buffering for a digital compressed video program, or media content instance, results from a sourced video program instance and its associated audio signal that originated as an analog video signal received in DHCT 16 as a broadcast TV program instance received via network communication interface 342 (FIG. 3). Such analog video signals are compressed into digital form by the encoder 317 (FIG. 3), or other digitizing hardware or software, in DHCT 16 as explained above.

Figure 4:
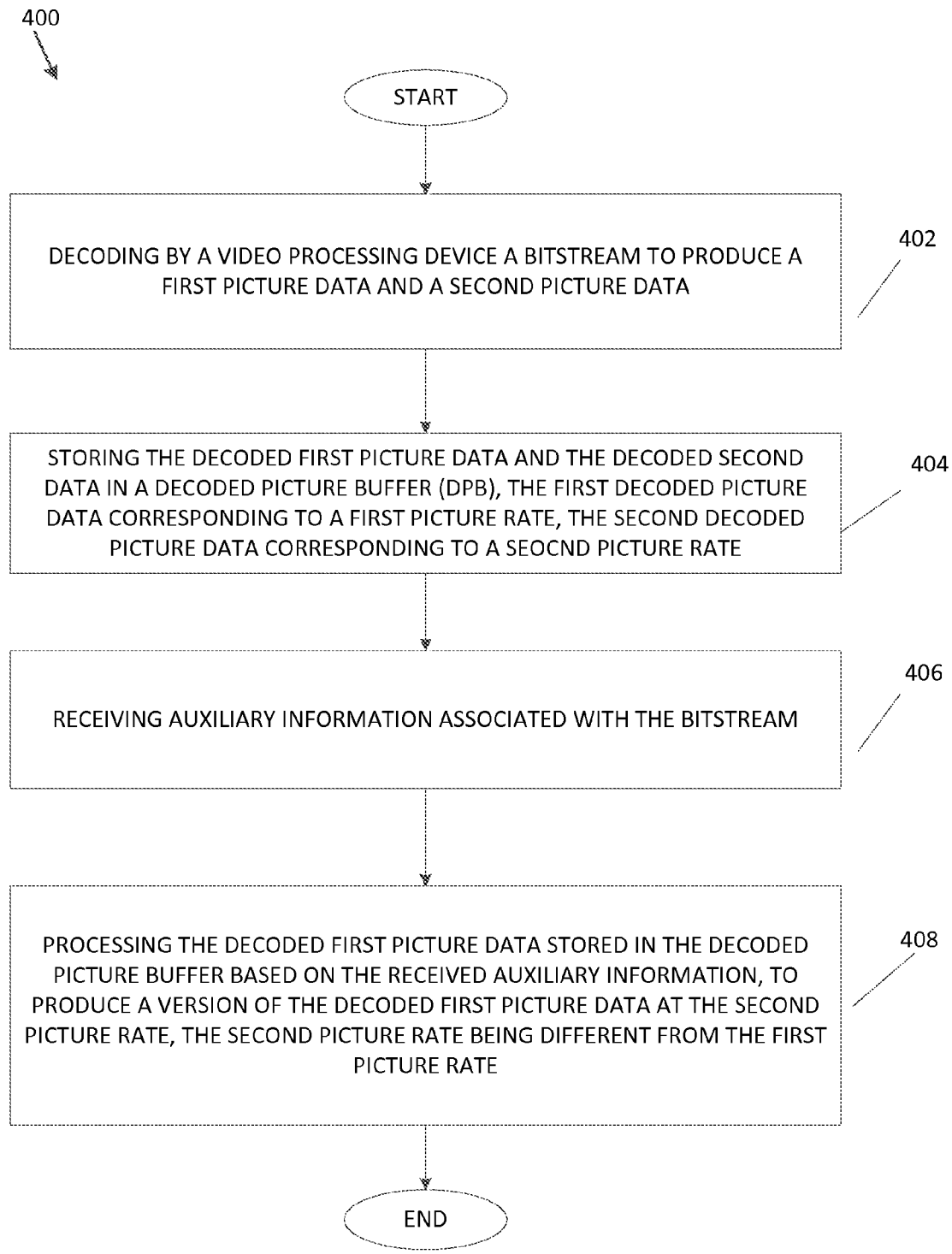
FIG. 4 is a flow diagram that illustrates one example VP method embodiment to process video based on auxiliary information.

Having described various embodiments of VP system, it should be appreciated that one VP method embodiment 400, illustrated in FIG. 4, can be broadly described decoding by a video processing device a video stream to produce a first picture data (402); storing the decoded first picture data in a decoded picture buffer, the first decoded picture data corresponding to a first picture rate (404); receiving auxiliary information corresponding to the video stream (406); and processing the decoded first picture data stored in the decoded picture buffer based on the received auxiliary information, wherein processing the first picture data based on the auxiliary information comprises processing the first picture data based on the auxiliary information to produce a second picture data having a second picture rate different from the first picture rate (408).

Figure 5:
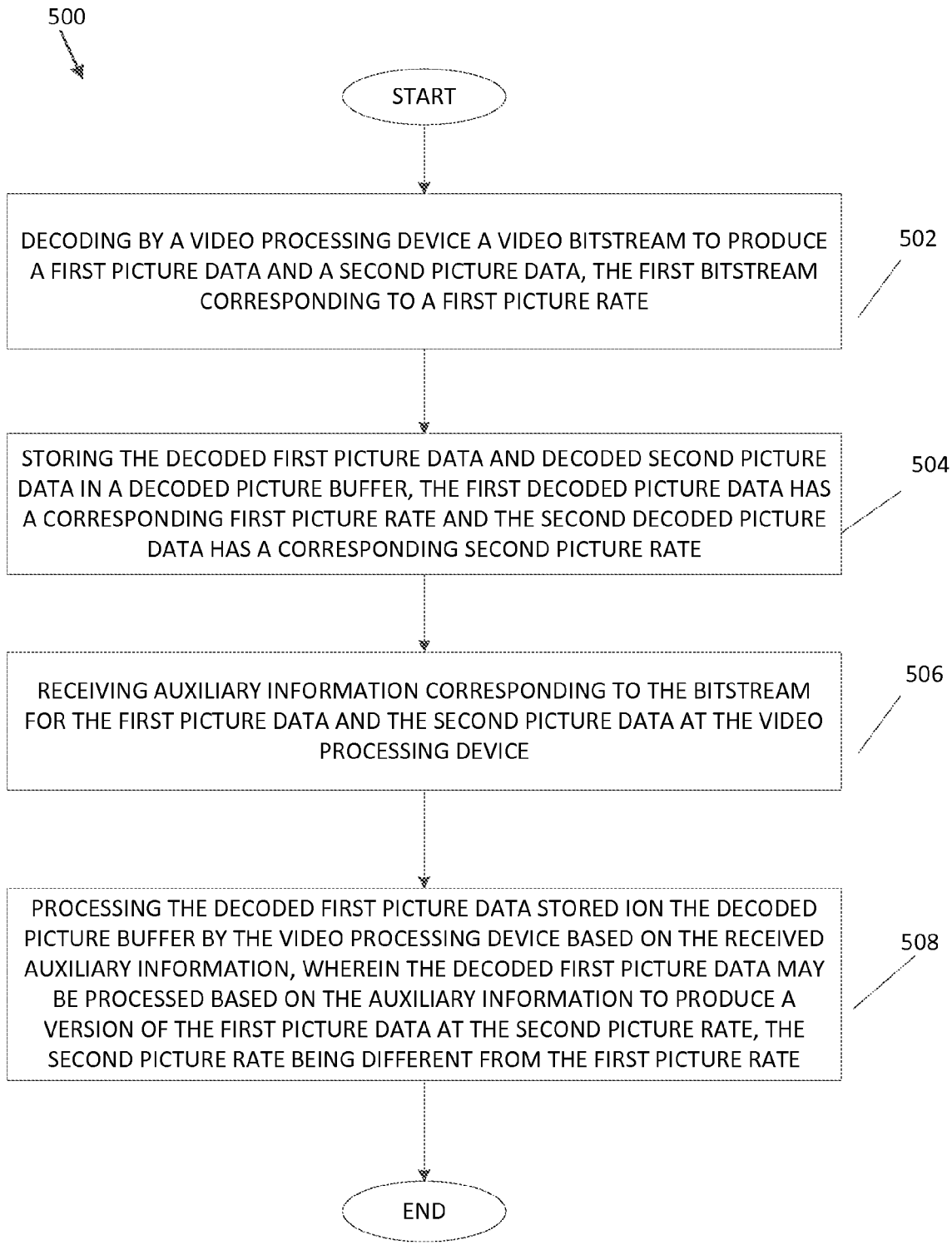
FIG. 5 is another flow diagram that illustrates one example VP method embodiment to process video based on auxiliary information.

In another VP method embodiment 500, illustrated in FIG. 5, can be broadly described decoding by a video processing device a first video stream to produce a first picture data, the first video stream corresponding to a first picture rate (502); decoding by the video processing device a second video stream to produce a second picture data, the second video stream corresponding to a second picture rate (504); receiving auxiliary information associated with the second video stream by the video processing device, the auxiliary information indicative of a repeated picture output for the second video stream (506); and processing by the video processing device the second picture data, wherein processing comprises repeating at least one of the second picture data to produce a third picture rate, wherein the third picture rate is same as the first picture rate (508).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 4 and 5 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the method described in FIGS. 4 and 5, either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the VP systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method for video processing comprising:
decoding by a video processing device a video stream to produce a first picture data;
storing the decoded first picture data in a decoded picture buffer, the first decoded picture data corresponding to a first picture rate;
receiving auxiliary information corresponding to the video stream, the auxiliary information comprising a first flag indicative of a rate change and a second flag indicative of a presence of a picture output index table that specifies a value corresponding to a number of repetitions of at least one picture stored in the decoded picture buffer; and
processing the decoded first picture data stored in the decoded picture buffer based on the received auxiliary information, wherein processing the first picture data based on the auxiliary information comprises repeating the first picture data based on the value corresponding to the number of repetitions of the at least one picture to produce a second picture data having a second picture rate different from the first picture rate.

2. The method of claim 1, wherein receiving the auxiliary information comprises receiving a repeat flag, wherein receiving the repeat flag comprises receiving the repeat flag indicative of the repetition of the at least one picture from the first picture data to produce the second picture data having the second picture rate.

3. The method of claim 2, wherein receiving the repeat flag comprises receiving the repeat flag indicative of the value corresponding to number of repetition of the at least one picture.

4. The method of claim 2, wherein receiving the repeat flag indicative of presence of the index further comprises receiving a coefficient to perform a lookup operation in the index table to determine the value.

5. The method of claim 2, further comprising: repeating the at least one picture based on a clock tick.

6. The method of claim 1, wherein receiving the auxiliary information corresponding to the video stream comprises receiving the auxiliary information corresponding to the video stream in picture parameter set (PPS).

7. The method of claim 1, wherein receiving the auxiliary information corresponding to the video stream comprises receiving the auxiliary information corresponding in supplemental enhancement information (SEI) message.

8. The method of claim 1, wherein receiving the auxiliary information corresponding to the video stream comprises receiving the auxiliary information corresponding to the video stream in a slice header of a first slice of the at least one picture.

9. A method of processing a video stream, the method comprising:
decoding by a video processing device a first video stream to produce a first picture data, the first video stream corresponding to a first picture rate;
decoding by the video processing device a second video stream to produce a second picture data, the second video stream corresponding to a second picture rate;
receiving auxiliary information associated with the second video stream by the video processing device, the auxiliary information indicative of a repeated picture output for the second video stream and a second flag indicative of a presence of a picture output index table which specifies a picture output repetition pattern; and
processing by the video processing device the second picture data, wherein processing comprises repeating at least one of the second picture data based on the picture output repetition pattern to produce a third picture rate, wherein the third picture rate is same as the first picture rate.

10. The method of claim 9, wherein receiving the auxiliary information by the video processing device comprises receiving the auxiliary information as video utility information (VUI).

11. The method of claim 9, wherein decoding by the video processing device the first video stream to produce a first picture data, further comprises:
storing the decoded picture data in a decoded picture buffer (DPB); and
outputting the picture from the DPB for display.

12. The method of claim 9, wherein decoding by the video processing device the first video stream to produce a first picture data, further comprises:

storing the decoded first picture data in a decoded picture buffer (DPB); and outputting the decoded first picture data from the DPB for display, wherein outputting comprises pulling a picture from the DPB on successive clock ticks.

13. The method of claim 9, wherein decoding by the video processing device the second video stream to produce the second picture data, further comprises:

storing the decoded second picture data in a decoded picture buffer (DPB); and outputting the second picture data from the DPB for display.

14. The method of claim 9, wherein processing by the video processing device the second picture data, further comprises:

determining, for a picture, whether there is a repeat flag associated with the picture; when there is a repeat flag associated with the picture, determining a repeat value; and repeating the picture on successive clock ticks.

15. The method of claim 14, wherein determining the repeat value comprises determining the repeat value from the picture output index table.

16. The method of claim 15, wherein determining the repeat value from the picture output index table comprises:

processing the auxiliary information to determine a picture output index; and performing a lookup operation in the picture output index table to determine the repeat value corresponding to the picture output index.

17. The method of claim 16, further comprising: determining an output time for the repeat picture corresponding to the clock ticks.

18. A system comprising:

a memory, and a processor coupled to the memory, the processor configured to:

decode by a video processing device a video stream to produce a first picture data;

store the decoded first picture data in a decoded picture buffer, the first decoded picture data corresponding to a first picture rate;

receive auxiliary information corresponding to the video stream, the auxiliary information comprising a first flag indicative of a rate change and a second flag indicative of a presence of a picture output index table which specifies a picture output repetition pattern; and process the decoded first picture data stored in the decoded picture buffer based on the received auxiliary information, wherein processing the first picture data based on the auxiliary information comprises repeating the first picture data based on the picture output repetition pattern to produce a second picture data having a second picture rate different from the first picture rate.

19. The system of claim 18, wherein the auxiliary information comprises a repeat flag indicative of repetition of the at least one picture from the first picture data to produce the third picture rate.

* * * * *